US009717100B2

(12) United States Patent
Viraraghavan

(10) Patent No.: US 9,717,100 B2
(45) Date of Patent: Jul. 25, 2017

(54) DETECTING PHYSICAL RANDOM ACCESS CHANNEL PREAMBLES IN A LONG TERM EVOLUTION COMMUNICATION SYSTEM

(71) Applicant: Tata Consultancy Services Limited, Mumbai (IN)

(72) Inventor: Venkata Subramanian Viraraghavan, Bangalore (IN)

(73) Assignee: TATA CONSULTANCY SERVICES LIMITED, Bangalore (IN)

( * ) Notice: Subject to any disclaimer, the term of this patent is extended or adjusted under 35 U.S.C. 154(b) by 87 days.

(21) Appl. No.: 14/922,819

(22) Filed: Oct. 26, 2015

(65) Prior Publication Data

US 2017/0019928 A1    Jan. 19, 2017

(30) Foreign Application Priority Data

Jul. 15, 2015  (IN) .......................... 2688/MUM/2015

(51) Int. Cl.
*H04W 74/08* (2009.01)
*H04W 72/04* (2009.01)
*H04L 27/26* (2006.01)

(52) U.S. Cl.
CPC ....... *H04W 74/0833* (2013.01); *H04L 27/261* (2013.01); *H04L 27/2636* (2013.01); *H04W 72/0446* (2013.01); *H04W 72/0453* (2013.01); *H04L 27/2649* (2013.01)

(58) Field of Classification Search
CPC ......... H04W 74/0833; H04W 72/0446; H04W 72/0453; H04L 27/261; H04L 27/2636; H04L 27/2649
See application file for complete search history.

(56) References Cited

U.S. PATENT DOCUMENTS

| 7,321,645 | B2 | 1/2008 | Lee et al. |
| 7,394,875 | B2 | 7/2008 | MacMullan et al. |
| 8,457,076 | B2 | 6/2013 | Kwon et al. |
| 2007/0291696 | A1* | 12/2007 | Zhang ..................... H04L 5/023 370/331 |
| 2009/0046629 | A1* | 2/2009 | Jiang ................... H04J 13/0059 370/328 |

(Continued)

*Primary Examiner* — Duc C Ho
(74) *Attorney, Agent, or Firm* — Ohlandt, Greeley, Ruggiero & Perle, LLP

(57) ABSTRACT

The present subject matter discloses a method implemented on a base station for generating Physical Random Access Channel (PRACH) reference segments and detecting PRACH preambles in a Long Term Evolution (LTE) communication system. The base station performs a series of mathematical techniques to generate the PRACH reference segments using a CAZAC sequence used for detecting PRACH preambles. Further, the base station identifies the PRACH by using a signal received by the base station. The base station segments the signal to generate contiguous or non-contiguous segments. Further, the base station uses a segment by segment multiplication and subsequent addition approach performed between values at each frequency location of PRACH frequency segments with a complex conjugate of the values at a corresponding frequency location of a PRACH reference segment. Subsequently the products are added together. The sum is then processed to detect one or more PRACH preambles and timing delays.

14 Claims, 9 Drawing Sheets

(56) References Cited

U.S. PATENT DOCUMENTS

2011/0064069 A1*  3/2011  Lipka .................... H04L 5/0007
                                                       370/344
2013/0208679 A1   8/2013  Joung et al.
2013/0215856 A1*  8/2013  Joung ................ H04L 27/2613
                                                       370/329

* cited by examiner

US 9,717,100 B2

DETECTING PHYSICAL RANDOM ACCESS CHANNEL PREAMBLES IN A LONG TERM EVOLUTION COMMUNICATION SYSTEM

CROSS-REFERENCE TO RELATED APPLICATIONS AND PRIORITY

The present application also claims benefit from Indian Complete Patent Application No. 2688/MUM/2015, filed on Jul. 15, 2015, the entirety of which is hereby incorporated by reference.

TECHNICAL FIELD

The present subject matter described herein, in general, relates to systems and methods for detection of Physical Random Access Channel (PRACH) preambles in Long Term Evolution (LTE) communication system.

BACKGROUND

A Long Term Evolution (LTE) communication system uses several channels for transferring voice and data over a network. LTE utilizes Multiple Input Multiple Output (MIMO) antenna technology and is developed to improve spectral efficiency, distance coverage, and operational costs. A LTE equipment providing network within a cell is installed over a Base Transceiver Station (BTS) or an eNodeB. A mobile device communicates with the BTS using several channels present in the LTE standard. For establishing a communication session, a receiver of the LTE equipment receives a signal from the mobile equipment. Further, the LTE receiver processes the received signal to achieve synchronization with the mobile device and thus establish a successful communication session.

FIG. 1 illustrates a conventional receiver architecture used in the LTE communication system. Received samples of a signal received by a receiver are provided to a Single Carrier-Frequency Division Multiple Access (SC-FDMA) receiver unit. The SC-FDMA receiver unit extracts SC-FDMA symbols from the received samples. Further, the SC-FDMA receiver unit discards cyclic prefixes of the SC-FDMA symbols to derive useful parts of the SC-FDMA symbols. The SC-FDMA receiver unit reverses a half-subcarrier shift performed at a transmitter station and applies a Discrete Fourier Transform (DFT) on the useful part of each of the SC-FDMA symbols in order to derive a PUxCH resource grid. The PUxCH resource grid is used by a Physical Uplink Shared Channel (PUSCH) receiver, a Physical Uplink Control Channel (PUCCH) receiver, and a Sounding Reference Signal (SRS) receiver. The PUSCH is used as an LTE uplink data channel and the PUCCH is used as an LTE uplink control channel. Further, the SRS is periodically transmitted by a terminal to a base station for uplink channel quality estimation and for maintaining synchronization, once achieved using a Physical Random Access Channel (PRACH). The conventional receiver unit also includes a functionality of frequency and timing error correction, as exemplified in the FIG. 1.

For initially achieving synchronization between a terminal and the base station, the PRACH is used. In one case, the received samples and a FFT of the useful part of the SC-FDMA symbols are provided to a PRACH receiver, in order to achieve the synchronization. In another case, only the received samples may be provided to the PRACH receiver for achieving the synchronization. Necessary signal information derived by the PUSCH receiver, the PUCCH receiver, the SRS receiver, and the PRACH receiver is provided to a second layer (Layer 2) of the LTE communication system.

FIG. 2 illustrates a block representation of a conventional method for detecting PRACH preambles in a LTE communication system. Further, FIG. 2 explains the conventional method using the received samples and the FFT of the useful part of the SC-FDMA symbols. A signal received by a base station comprises a Cyclic Prefix (CP) and a PRACH preamble sequence part, at step 202. The PRACH preamble sequence part (assumed not including any delay) is segmented into a plurality of segments having uniform sizes, at step 204. In one case the PRACH preamble sequence part may be segmented into 12 segments represented by a=0 to a=11. Successively, a half-carrier shift and a Discrete Fourier Transform (DFT) may be performed on each of the 12 segments to generate frequency domain segments corresponding to the 12 segments, at step 206.

Subsequent to generation of the frequency domain segments, PRACH frequency segments are generated by selecting PRACH frequency locations from the frequency domain segments. The PRACH frequency segments are serially concatenated, at step 208. A Discrete Fourier Transform (DFT) operation is performed on 1536 points of the serially concatenated segments, at step 210. An output of the FFT operation is correlated, at step 214, with 839 points of predetermined references shown at step 212. A correlation product is thus generated at step 216. Subsequently, an Inverse Discrete Fourier Transform (IDFT) is performed on 1536 points of the correlation product to detect the PRACH preamble and its timing advance, at step 218.

Thus, the conventional technique for detecting the PRACH preambles uses many transformations of the signal between time-domain and frequency-domain. Further, 1536-point IFFT is performed on the correlation product to detect the PRACH preambles. Thus, the processing done using the conventional technique requires a lot of computations being performed at the base station, resulting in high computational complexity.

SUMMARY

This summary is provided to introduce aspects related to generating Physical Random Access Channel (PRACH) reference segments in a Long Term Evolution (LTE) communication system and detecting the PRACH preambles in the LTE communication system and the aspects are further described below in the detailed description. This summary is not intended to identify essential features of the claimed subject matter nor is it intended for use in determining or limiting the scope of the claimed subject matter.

In one implementation, a method for generating Physical Random Access Channel (PRACH) reference segments in a Long Term Evolution (LTE) communication system is disclosed. The method may comprise generating a plurality of preamble sequences using a Constant Amplitude Zero Auto Correlation (CAZAC) sequence. Each preamble sequence may have length of a valid CAZAC sequence. The method may further comprise transforming the plurality of preamble sequences into a plurality of frequency domain signals by performing a Discrete Fourier Transform (DFT) on the plurality of preamble sequences. The method may comprise generating a plurality of subcarrier mapped signals by performing subcarrier mapping of the plurality of frequency domain signals. The subcarrier mapping may be performed based on a subcarrier spacing associated with a Physical Random Access Channel (PRACH) in a Long Term Evolution (LTE) communication system. The method may comprise transforming the plurality of subcarrier mapped signals into a plurality of time domain signals by performing an Inverse DFT (IDFT). The plurality of time domain signals may be sampled at a sampling rate suitable to a receiver system and a suitable IDFT length is selected based on the sampling rate, in order to perform the transformations. The method may further comprise generating a plurality of standard PRACH preamble signals by adding a Cyclic Prefix (CP) to each time domain signal of the plurality of time domain signals. The CP may be a copy of an end-segment of the time domain signal. The method may further comprise segmenting each standard PRACH preamble signal from the plurality of standard PRACH preamble signals to generate a plurality of segments of uniform size. The segments may either be contiguous or non-contiguous. The non-contiguous segments may be separated by a time gap accommodated in between each segment of the non-contiguous segments. The method may comprise generating a plurality of frequency domain segments by performing a half-subcarrier shift and a DFT on the plurality of segments. The frequency domain segments may comprise sub-carriers spaced in accordance with a Single Carrier Frequency Division Multiple Access (SC-FDMA) signal. The method may also comprise generating a plurality of PRACH reference segments by selecting frequency locations from the plurality of frequency domain segments. The frequency locations may correspond to PRACH frequency locations.

In one implementation, a base station for generating Physical Random Access Channel (PRACH) reference segments in a Long Term Evolution (LTE) communication system is disclosed. The base station may comprise a memory coupled to a processor. The processor is connected to a plurality of units configured to perform a function. A preamble sequence generation unit may generate a plurality of preamble sequences using a CAZAC sequence. Each preamble sequence may have length of a valid CAZAC sequence. A first Discrete Fourier Transform (DFT) unit may transform the plurality of preamble sequences into a plurality of frequency domain signals by performing a DFT on the preamble sequences. A subcarrier mapping unit may generate a plurality of subcarrier mapped signals by performing subcarrier mapping of the plurality of frequency domain signals. The subcarrier mapping may be performed based on a subcarrier spacing associated with a Physical Random Access Channel (PRACH) in a Long Term Evolution (LTE) communication system. An Inverse DFT (IDFT) unit may transform the plurality of subcarrier mapped signals into a plurality of time domain signals by performing an IDFT. The plurality of time domain signals may be sampled at a sampling rate suitable to a receiver system and a suitable IDFT length is selected based on the sampling rate, in order to perform the transformations. A CP-insertion unit may generate a plurality of standard PRACH preamble signals by adding a Cyclic Prefix (CP) to each time domain signal of the plurality of time domain signals. The CP is a copy of an end-segment of the time domain signal. A segmenting unit may segment each standard PRACH preamble signal from the plurality of standard PRACH preamble signals to generate a plurality of segments of uniform size. The segments may either be contiguous or non-contiguous. The non-contiguous segments may be separated by a time gap accommodated in between each segment of the non-contiguous segments. A second DFT unit may generate a plurality of frequency domain segments by performing a half-subcarrier shift and a DFT on the plurality of segments. The frequency domain segments comprise sub-carriers spaced in accordance with a Single Carrier Frequency Division Multiple Access (SC-FDMA) signal. A first subcarrier de-mapping unit may generate a plurality of PRACH reference segments by selecting frequency locations from the plurality of frequency domain segments. The frequency locations may correspond to PRACH frequency locations.

In one implementation, a non-transitory computer readable medium embodying a program executable in a computing device for generating Physical Random Access Channel (PRACH) reference segments in a Long Term Evolution (LTE) communication system is disclosed. The program may comprise a program code for generating a plurality of preamble sequences using a CAZAC sequence. Each preamble sequence may have length of a valid CAZAC sequence. The program may further comprise a program code for transforming the plurality of preamble sequences into a plurality of frequency domain signals by performing a DFT on the plurality of preamble sequences. The program may further comprise a program code for generating a plurality of subcarrier mapped signals by performing subcarrier mapping of the plurality of frequency domain signals. The subcarrier mapping may be performed based on a subcarrier spacing associated with a Physical Random Access Channel (PRACH) in a Long Term Evolution (LTE) communication system. The program may further comprise a program code for transforming the plurality of subcarrier mapped signals into a plurality of time domain signals by performing an IDFT. The plurality of time domain signals may be sampled at a sampling rate suitable to a receiver system and a suitable IDFT length is selected based on the sampling rate, in order to perform the transformations. The program may further comprise a program code for generating a plurality of standard PRACH preamble signals by adding a Cyclic Prefix (CP) to each time domain signal of the plurality of time domain signals. The CP may be a copy of an end-segment of the time domain signal. The program may further comprise a program code for segmenting each standard PRACH preamble signal from the plurality of standard PRACH preamble signal to generate a plurality of segments of uniform size. The segments may either be contiguous or non-contiguous. The non-contiguous segments may be separated by a time gap accommodated in between each segment of the non-contiguous segments. The program may further comprise a program code for generating a plurality of frequency domain segments by performing a half-subcarrier shift and a DFT on the plurality of segments. The frequency domain segments may comprise sub-carriers spaced in accordance with a Single Carrier Frequency Division Multiple Access (SC-FDMA) signal. The program may further comprise a program code for generating a plurality of PRACH reference segments by selecting frequency locations from the plurality of frequency domain segments. The frequency locations may correspond to PRACH frequency locations.

In another implementation, a method for detecting Physical Random Access Channel (PRACH) preambles in a Long Term Evolution (LTE) communication system is disclosed. The method may further comprise receiving a signal for detecting Physical Random Access Channel (PRACH) preambles. The method may comprise segmenting the signal into a plurality of segments of uniform sizes. The plurality of segments may be one of contiguous segments or non-contiguous segments. The contiguous segments may have no time gap between one another. The non-contiguous segments may have a time-gap in between adjacent segments of the plurality of segments. The non-contiguous segments may correspond to Single Carrier Frequency Division Multiple Access (SC-FDMA) symbols associated with Long Term Evolution (LTE) standards. The method may comprise generating frequency domain segments by performing a half-subcarrier shift and a DFT on the plurality of segments. The method may further comprise generating a plurality of PRACH frequency segments by selecting frequency locations from the frequency domain segments. The frequency locations may correspond to PRACH frequency locations. The method may further comprise producing a plurality of intermediate correlation segments by multiplying values at each frequency location of the plurality of PRACH frequency segments with a complex conjugate of the values at corresponding frequency locations of a plurality of PRACH reference segments. Each intermediate correlation segment may comprise a number of sub-carriers spanning the PRACH frequency region as defined in a LTE communication system. The method may comprise generating a plurality of combined intermediate correlation results by adding the values at the corresponding frequency locations of each intermediate correlation segment. The method may also comprise generating a plurality of correlation results by performing an IDFT on the combined intermediate correlation result. The method may also comprise detecting one or more PRACH preambles by comparing peaks of the plurality of correlation results with a predefined threshold to identify one or more peak locations. Further, timing delays may be identified based on the identified peak locations.

In another implementation, a base station for detecting Physical Random Access Channel (PRACH) in a Long Term Evolution (LTE) communication system is disclosed. The base station may comprise a memory coupled to a processor. The processor is connected to a plurality of units configured to perform a function. A receiving unit may receive a signal for detecting Physical Random Access Channel (PRACH) preambles. A segmentation unit may segment the signal into a plurality of segments of uniform sizes. The plurality of segments may be one of contiguous segments or non-contiguous segments. The contiguous segments may have no time gap between one another. The non-contiguous segments may have a time-gap in between adjacent segments of the plurality of segments. The non-contiguous segments may correspond to Single Carrier Frequency Division Multiple Access (SC-FDMA) symbols associated with Long Term Evolution (LTE) standards. A third Discrete Fourier Transform (DFT) unit may generate frequency domain segments by performing a half-subcarrier shift and a DFT on the plurality of segments. A second subcarrier de-mapping unit may generate a plurality of PRACH frequency segments by selecting frequency locations from the frequency domain segments. The frequency locations may correspond to PRACH frequency locations. A multiplication unit may produce a plurality of intermediate correlation segments by multiplying values at each frequency location of the plurality of PRACH frequency segments with a complex conjugate of corresponding frequency locations of a plurality of PRACH reference segments. Each intermediate correlation segment may comprise a number of sub-carriers spanning the PRACH frequency region as defined in a LTE communication system. An adding unit may generate a plurality of combined intermediate correlation results by adding the values at corresponding frequency locations of each intermediate correlation segment. A second Inverse DFT (IDFT) unit may generate a plurality of correlation results by performing an IDFT on the combined intermediate correlation result. A PRACH detection unit may detect one or more PRACH preambles by comparing peaks of the plurality of correlation results with a predefined threshold to identify one or more peak locations. Further, timing delays may be identified based on the identified peak locations.

In another implementation, a non-transitory computer readable medium embodying a program executable in a computing device for detecting Physical Random Access Channel (PRACH) in a Long Term Evolution (LTE) communication system is disclosed. The program may comprise a program code for receiving a signal for detecting Physical Random Access Channel (PRACH) preambles. The program may further comprise a program code for segmenting the signal into a plurality of segments of uniform sizes. The plurality of segments may be one of contiguous segments or non-contiguous segments. The contiguous segments may not have a time gap between one another. The non-contiguous segments may have a time-gap in between adjacent segments of the plurality of segments. The non-contiguous segments may correspond to Single Carrier Frequency Division Multiple Access (SC-FDMA) symbols associated with Long Term Evolution (LTE) standards. The program may further comprise a program code for generating frequency domain segments by performing a half-subcarrier shift and a DFT on the plurality of segments. The program may further comprise a program code for generating a plurality of PRACH frequency segments by selecting frequency locations from the frequency domain segments. The frequency locations may correspond to PRACH frequency locations. The program may further comprise a program code for producing a plurality of intermediate correlation segments by multiplying values at each frequency location of the plurality of PRACH frequency segments with a complex conjugate of a corresponding frequency location of a PRACH reference segment. Each intermediate correlation segment may comprise number of sub-carriers spanning the PRACH frequency region as defined in a LTE communication system. The program may further comprise a program code for generating a plurality of combined intermediate correlation results by adding values at corresponding frequency locations of each intermediate correlation segment. The program may further comprise a program code for generating a plurality of correlation results by performing an IDFT on the combined intermediate correlation result. The program may further comprise a program code for detecting one or more PRACH preambles by comparing peaks of the plurality of correlation results with a predefined threshold to identify one or more peak locations. Further, timing delays may be identified based on the identified peak locations.

BRIEF DESCRIPTION OF THE DRAWINGS

The detailed description is described with reference to the accompanying Figures. In the Figures, the left-most digit(s) of a reference number identifies the Figure in which the reference number first appears. The same numbers are used throughout the drawings to refer like features and components.

DETAILED DESCRIPTION

Figure 1:
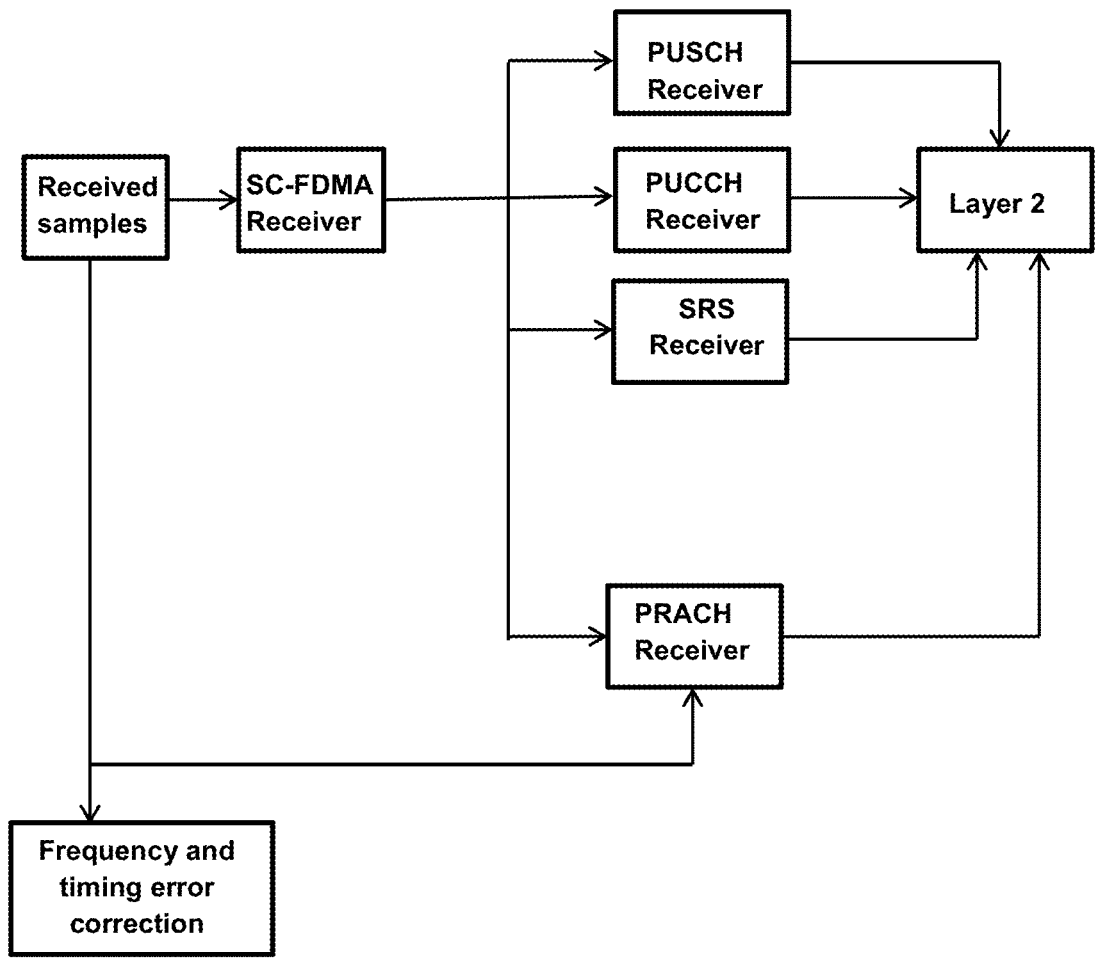
FIG. 1 illustrates a conventional receiver architecture used in the LTE communication system, in accordance with prior art.
Figure 2:
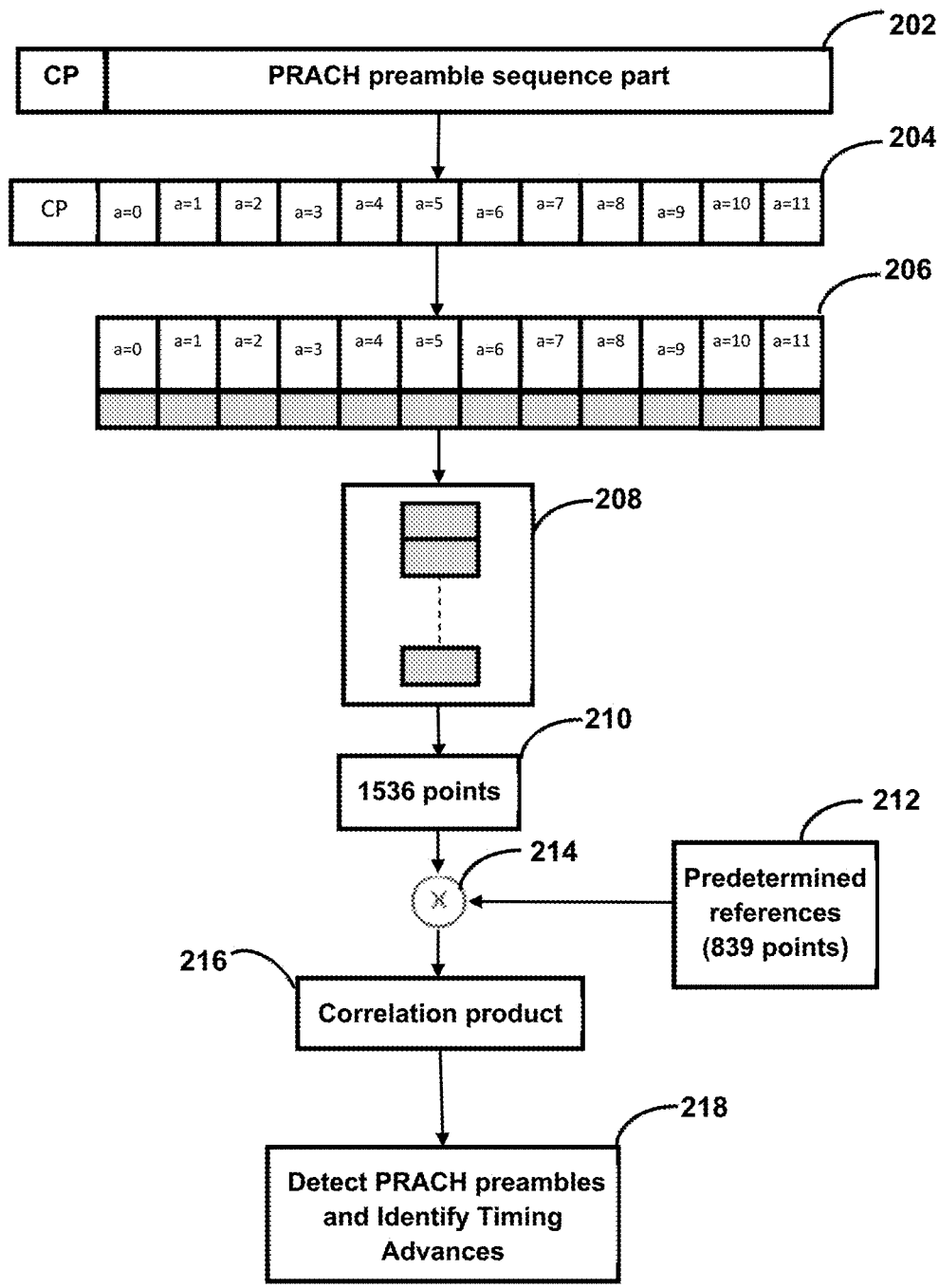
FIG. 2 illustrates a block representation of a conventional method for detecting a PRACH preambles in LTE communication system, in accordance with prior art.

Systems and methods for generating Physical Random Access Channel (PRACH) reference segments and detecting PRACH preambles in a Long Term Evolution (LTE) communication system are described. The method may be performed on a base station (eNodeB or eNB) of the LTE communication system. In order to generate the PRACH reference segments, the base station may generate a plurality of preamble sequences using a CAZAC sequence. Each preamble sequence may have length of a valid CAZAC sequence. The length of each preamble sequence may be one of 839 and 139. Successively, the base station may transform the preamble sequences into frequency domain signals by performing a DFT on the preamble sequences. The base station may then generate subcarrier mapped signals by performing subcarrier mapping of the frequency domain signals. The subcarrier mapping may be performed based on a subcarrier spacing associated with the PRACH. The base station may perform an Inverse DFT (IDFT) on the subcarrier mapped signals to transform the subcarrier mapped signals into time domain signals.

Post generating the time domain signals, the base station may generate a standard PRACH preamble signal by adding a Cyclic Prefix (CP) to a time domain signal of the time domain signals. Successively, the base station may segment the standard PRACH preamble signal to generate a plurality of segments of uniform size. The segments may either be contiguous or non-contiguous. The non-contiguous segments may be separated by a time gap present in between each segment of the non-contiguous segments. The base station may perform a half-subcarrier shift and a DFT on the plurality of segments to generate frequency domain segments. The frequency domain segments may comprise subcarriers spaced in accordance with a Single Carrier Frequency Division Multiple Access (SC-FDMA) signal. The base station may select frequency locations from the frequency domain segments to generate PRACH reference segments.

Upon generating the PRACH reference segments, the base station may receive a signal for detecting PRACH preambles. The base station may segment the signal into a plurality of segments of uniform sizes. The plurality of segments may either be contiguous segments or non-contiguous segments. The base station may then generate frequency domain segments by performing a half-subcarrier shift and a DFT on the plurality of segments. The base station may select frequency locations from the frequency domain segments to generate PRACH frequency segments. Subsequently, the base station may multiply values at each frequency location of the PRACH frequency segments with a complex conjugate of the values at a corresponding frequency location of a PRACH reference segment to produce intermediate correlation segments. The base station may add the values at corresponding frequency locations of each intermediate correlation segment to generate a combined intermediate correlation result. The base station may then perform an Inverse DFT (IDFT) on the combined intermediate correlation result to generate a correlation result. Peaks of the correlation result may then be compared with a predefined threshold to identify one or more peak locations, for detecting the one or more PRACH preambles. Further, the identified peak locations may be used to identify timing delays.

While aspects of described system and method for detecting Physical Random Access Channel (PRACH) preambles in a Long Term Evolution (LTE) communication system may be implemented in any number of base stations i.e. eNodeB (eNB), different computing systems, environments, and/or configurations, the embodiments are described in the context of the following exemplary system.

Figure 3:
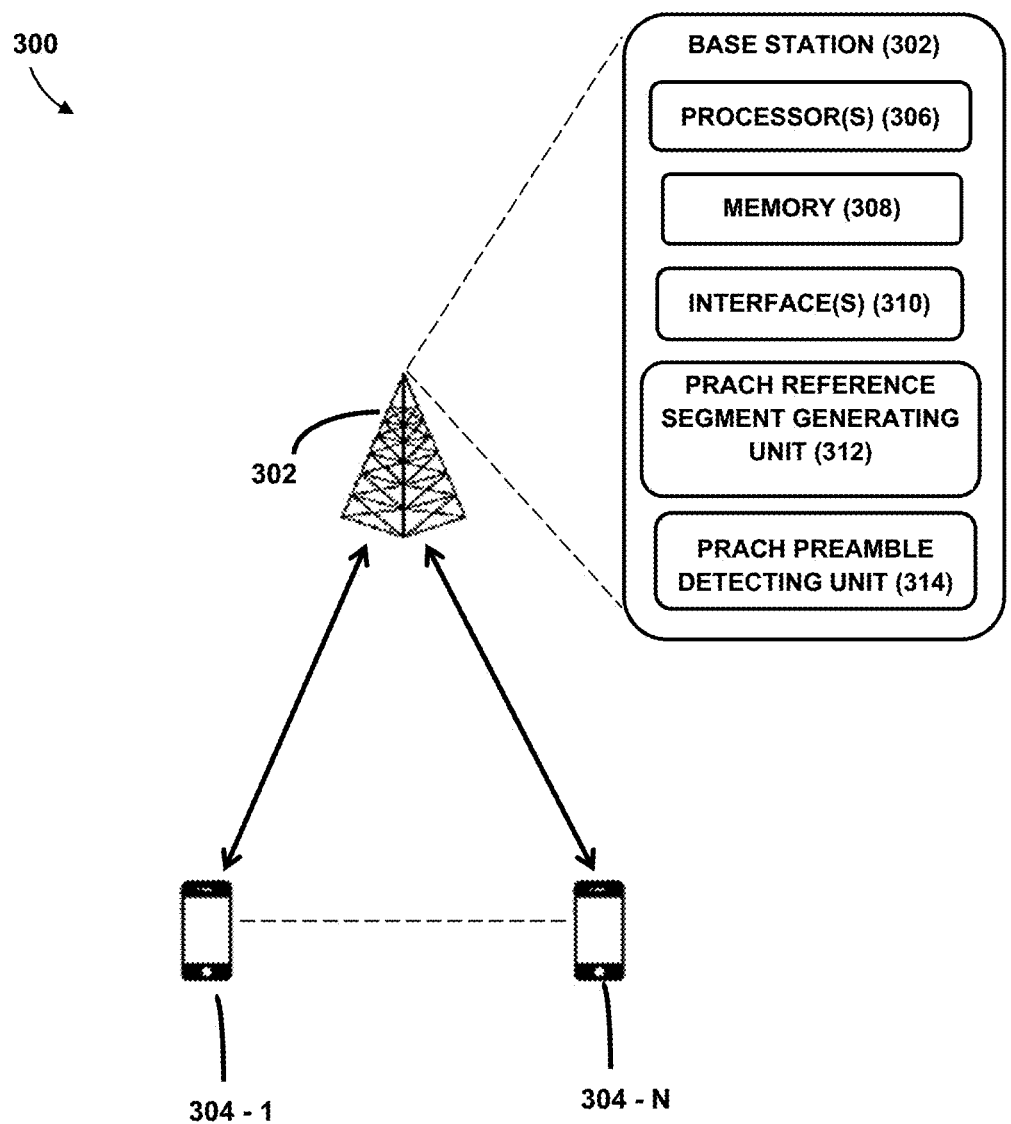
FIG. 3 illustrates a network implementation of a base station serving mobile terminals in a Long Term Evolution (LTE) communication system, in accordance with an embodiment of the present subject matter.

Referring now to FIG. 3, a network implementation of a base station serving mobile terminals in a Long Term Evolution (LTE) communication system 300 is shown, in accordance with an embodiment of the present subject matter. The LTE communication system 300 may comprise a base station 302 present in each cell. Mobile terminals (304-1 to 304-N) may try to communicate with the base station 302 in order to achieve synchronization and subsequently achieve a connection with the base station 302. Examples of the mobile terminals (304-1 to 304-N) may include a mobile phone, a smart phone, a PDA, a tablet, or any other computing device having at least one of voice calling capability and data communication capability.

In one embodiment, the base station 302 may include processor(s) 306, a memory 308, interface(s) 310, PRACH reference segment generating unit 312, and PRACH preamble detecting unit 314. Further, the processor(s) 306 may be implemented as one or more microprocessors, microcomputers, microcontrollers, digital signal processors, central processing units, state machines, logic circuitries, and/or any devices that manipulate signals based on operational instructions. Among other capabilities, the processor(s) 306 is configured to fetch and execute computer-readable instructions stored in the memory 308. The PRACH reference segment generating unit 312 and the PRACH preamble detecting unit 314 may be indicative of a functionality of the processor 306 or may be separate hardware units functioning along with the processor 306.

In one embodiment, the PRACH reference segment generating unit 312 may comprise a preamble sequence generation unit 402, a first Discrete Fourier Transform (DFT) unit 404, a subcarrier mapping unit 406, an Inverse DFT (IDFT) unit 408, a CP-insertion unit 410, a segmenting unit 412, a second DFT unit 414, and a first subcarrier de-mapping unit 416.

In one embodiment, the PRACH preamble detecting unit 314 may comprise a receiving unit 502, a segmentation unit 504, a third DFT unit 506, a second subcarrier de-mapping unit 508, a multiplication unit 510, an adding unit 512, a second Inverse DFT (IDFT) unit 514, and a PRACH preamble detection unit 516.

The memory 308 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The interface(s) 310 may include a variety of software and hardware interfaces, for example, a web interface, a Graphical User Interface (GUI), a Command Line Interface (CLI) and the like. The interface(s) 310 may be used for configuring the base station 302.

Further, the LTE communication system 300 may be implemented using communication standards such as IEEE 802.16 (WiMAX), 3GPP-LTE, and other standards which require an exclusive set of frequency bands and where nodes periodically send signals on each band in the exclusive set, even when no user communication is performed. For example, a communication standard may periodically communicate synchronization and control signals. These signals may be time-slotted, but they have to be transmitted on the entire frequency band, as is the case for Long Term Evolution (LTE). The invention is also understood to be applicable to various networks in which unreserved spectrum are available, as in Frequency Division Multiple Access (FDMA) deployment. The invention may be implemented using other communication standards and technologies present in the art.

The base station 302 may comprise suitable logic, interfaces, circuitry, and/or code that may be operable to communicate data and voice wirelessly by utilizing one or more cellular standards such as IS-95, CDMA2000, GSM, UMTS, TD-SCDMA, extensions thereto, and/or variants thereof. In this regard, the base station 302 may communicate with communication devices such as the mobile terminals (304-1 to 304-N). Exemplary cellular standards supported by the base station 302 may be specified in the International Mobile Telecommunications-2000 (IMT-2000) standard and/or developed by the 3rd generation partnership project (3GPP) and/or the 3rd generation partnership project 2 (3GPP2). Additionally, the base station 302 may each comprise suitable logic, interfaces, circuitry, and/or code that may be operable to communicate over Internet Protocol (IP) capable networks.

The base station 302 may be connected to other base stations or other networks. The other networks may comprise corporate intranet, Internet, public switched telephone network (PSTN), a Serving General Packet Radio Services (GPRS) Support Node (SGSN), a Gateway GPRS Support Node (GGSN), Evolved Packet Core (EPC), and the like.

Figure 4:
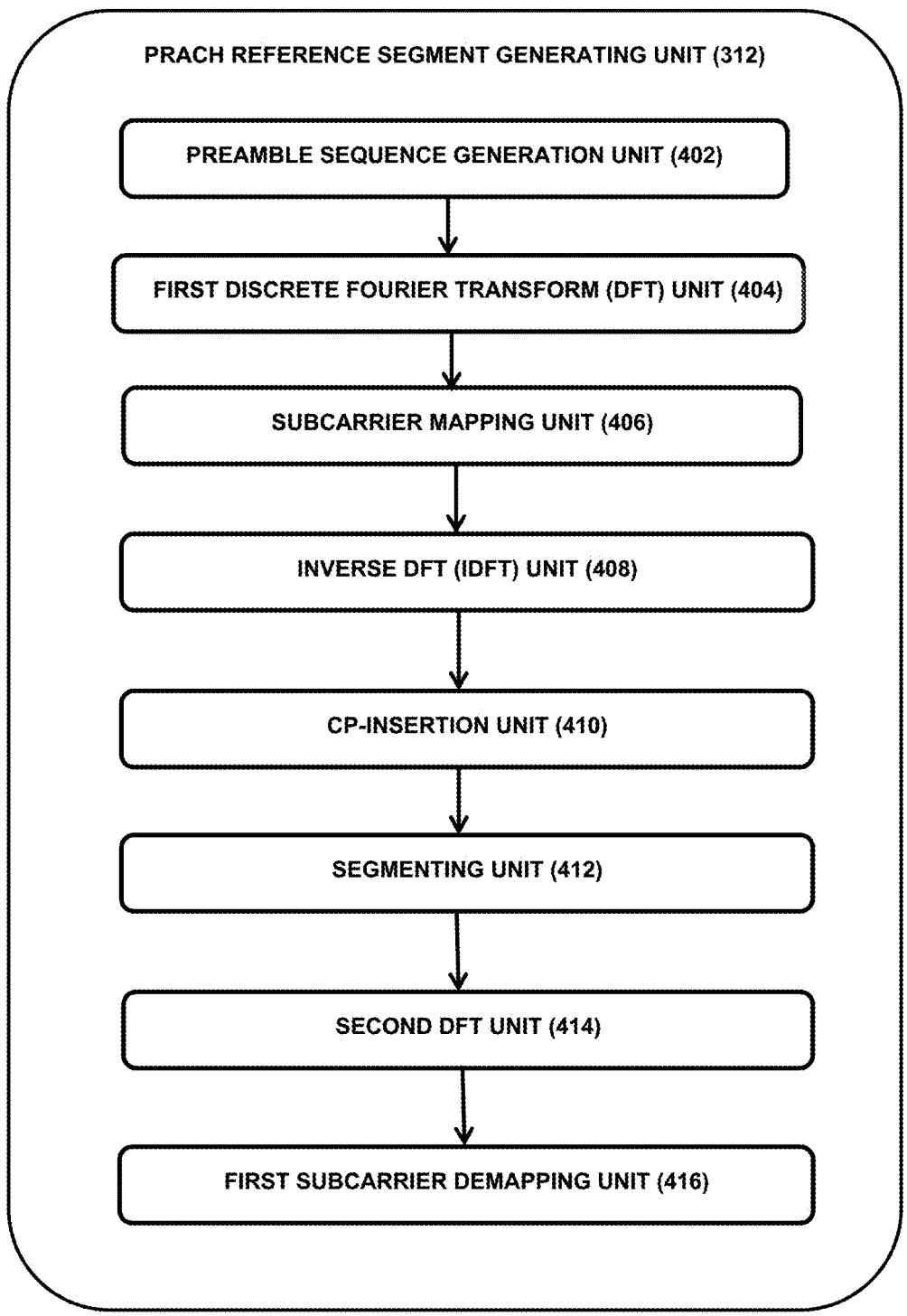
FIG. 4 illustrates a Physical Random Access Channel (PRACH) reference segment generating unit of the base station, in accordance with an embodiment of the present subject matter.

Referring now to FIG. 4 the Physical Random Access Channel (PRACH) segment generating unit 312 of the base station 302 is described, in accordance with an embodiment of the present subject matter. The preamble sequence generation unit 402 may generate a plurality of preamble sequences. In one case, the plurality of preamble sequences may be generated by using a Constant Amplitude Zero Autocorrelation (CAZAC) sequence. The CAZAC sequences are also known as Zadoff-Chu (ZC) sequences. The CAZAC sequence has best auto-correlation properties and is thus used for generating the plurality of preamble sequences. Each preamble sequence of the plurality of preamble sequences may have a length of valid CAZAC sequence. The length of each preamble sequence may be one of 839 and 139. A preamble sequence length of 839 may be used for both Time-Division Duplexing (TDD) and Frequency-Division Duplexing (FDD). Further, a preamble sequence length of 139 may be used only for TDD. The plurality of preamble sequences are generated using a below mentioned Equation 1.

$$x_u[n] = e^{\frac{j\pi n(n+1)u}{N_{ZC}}}, n \in \{0, 1, ..., N_{ZC} - 1\} \qquad \text{Equation 1}$$

In Equation 1, u denotes a root sequence number and $N_{ZC}=839$ for PRACH preamble formats 0 to 3 and $N_{ZC}=139$ for PRACH preamble format 4. In case a $v^{th}$ cyclic shift is introduced in the Equation 1, we get Equation 2 as mentioned below.

$$x_{u,v}[n] = x_u[n+vN_{CS}] \qquad \text{Equation 2}$$

In Equation 2, v denotes a number of cyclic shift i.e. $v^{th}$ cyclic shift and $N_{CS}$ denotes a configurable parameter determining a gap between cyclic shifts. Post generation of the plurality of preamble sequences, the first Discrete Fourier Transform (DFT) 404 unit may transform the preamble sequences into frequency domain signals by performing a DFT operation on the preamble sequences. Subsequently, the subcarrier mapping unit 406 may generate subcarrier mapped signals by performing subcarrier mapping of the frequency domain signals. The subcarrier mapping may be performed based on a subcarrier spacing associated with a Physical Random Access Channel (PRACH) in the LTE communication system 300.

After generation of the subcarrier mapped signals, the Inverse DFT (IDFT) unit 408 may operate on the subcarrier mapped signals. The IDFT unit 408 may transform the subcarrier mapped signals into time domain signals by performing an IDFT operation. In one case, the time domain signals may be sampled at a sampling rate suitable to a receiver system and a suitable IDFT length is selected based on the sampling rate, so as to perform transformations. Thereafter, the time domain signals may be processed by the CP-insertion unit 410. The CP-insertion unit 410 may add a Cyclic Prefix (CP) to a time domain signal of the time domain signals for generating a standard PRACH preamble signal. Specifically, the CP is a copy of an end-segment of the time domain signal and acts as a guard interval to prevent an Inter Symbol Interference (ISI) between the time domain signals.

Subsequent to generation of the standard PRACH preamble signal, the segmenting unit 412 may segment the standard PRACH preamble signal to generate a plurality of segments. In one case, the plurality of segments may be of uniform sizes. The segments may either be contiguous or non-contiguous. The non-contiguous segments may be separated due to presence of a time gap in between each segment of the non-contiguous segments.

Consequently after generation of the plurality of segments, the second DFT unit 414 may perform a half-subcarrier shift and a DFT operation on the plurality of segments in order to generate frequency domain segments. In one case, the frequency domain segments may comprise sub-carriers spaced in accordance with a Single Carrier Frequency Division Multiple Access (SC-FDMA) signal. After generation of the frequency domain segments, the first subcarrier de-mapping unit 416 may select frequency locations from the frequency domain segments. The frequency locations may correspond to PRACH frequency locations. Upon selection of the frequency locations, PRACH reference segments are generated. Thus, the base station 302 may generate the PRACH reference segments for once, in an above described manner. Thereafter, the base station 302 may use the PRACH reference segments for detecting the PRACH preambles using a below described technique.

Figure 5:
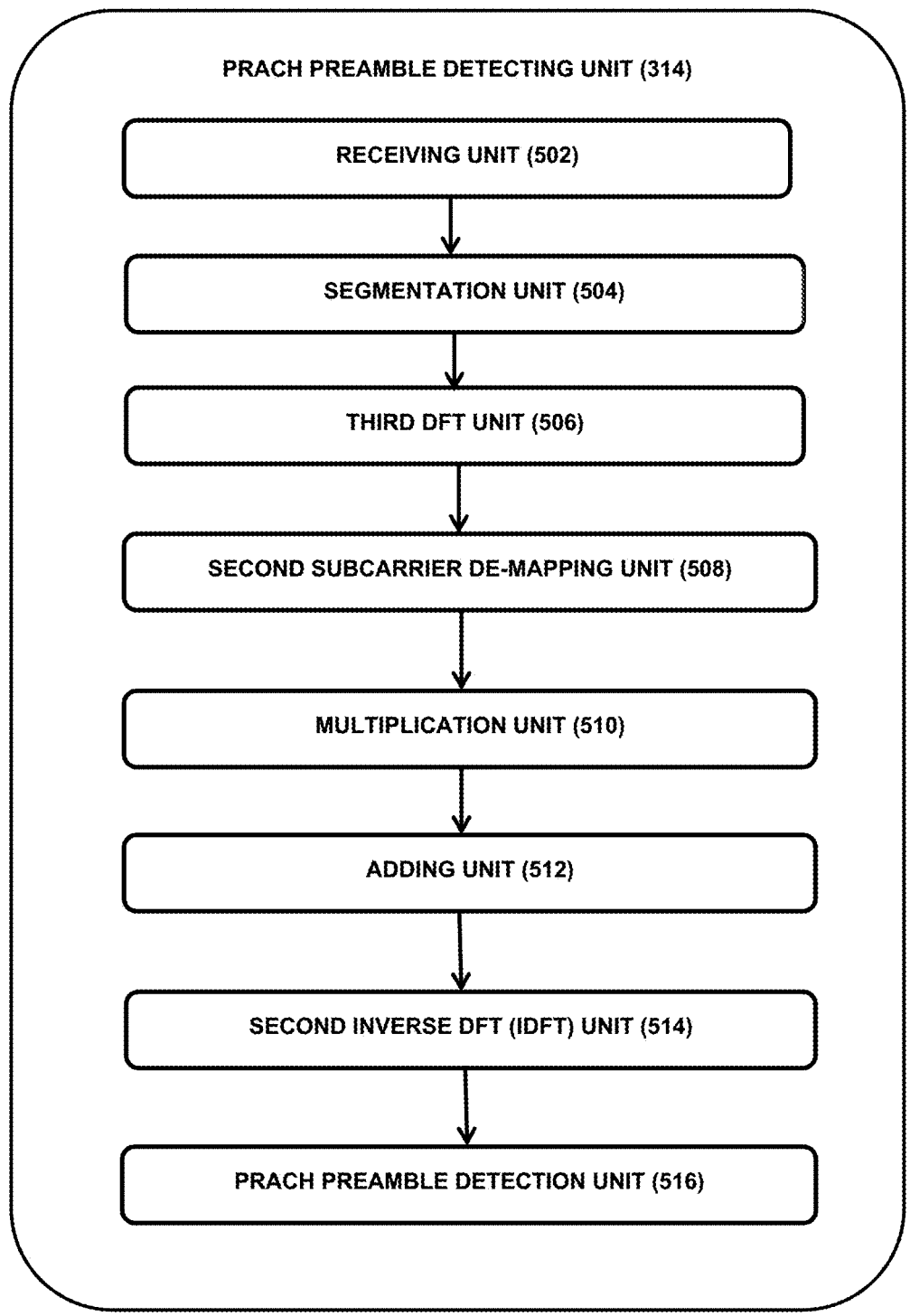
FIG. 5 illustrates a PRACH preamble detecting unit of the base station, in accordance with an embodiment of the present subject matter.
Figure 6:
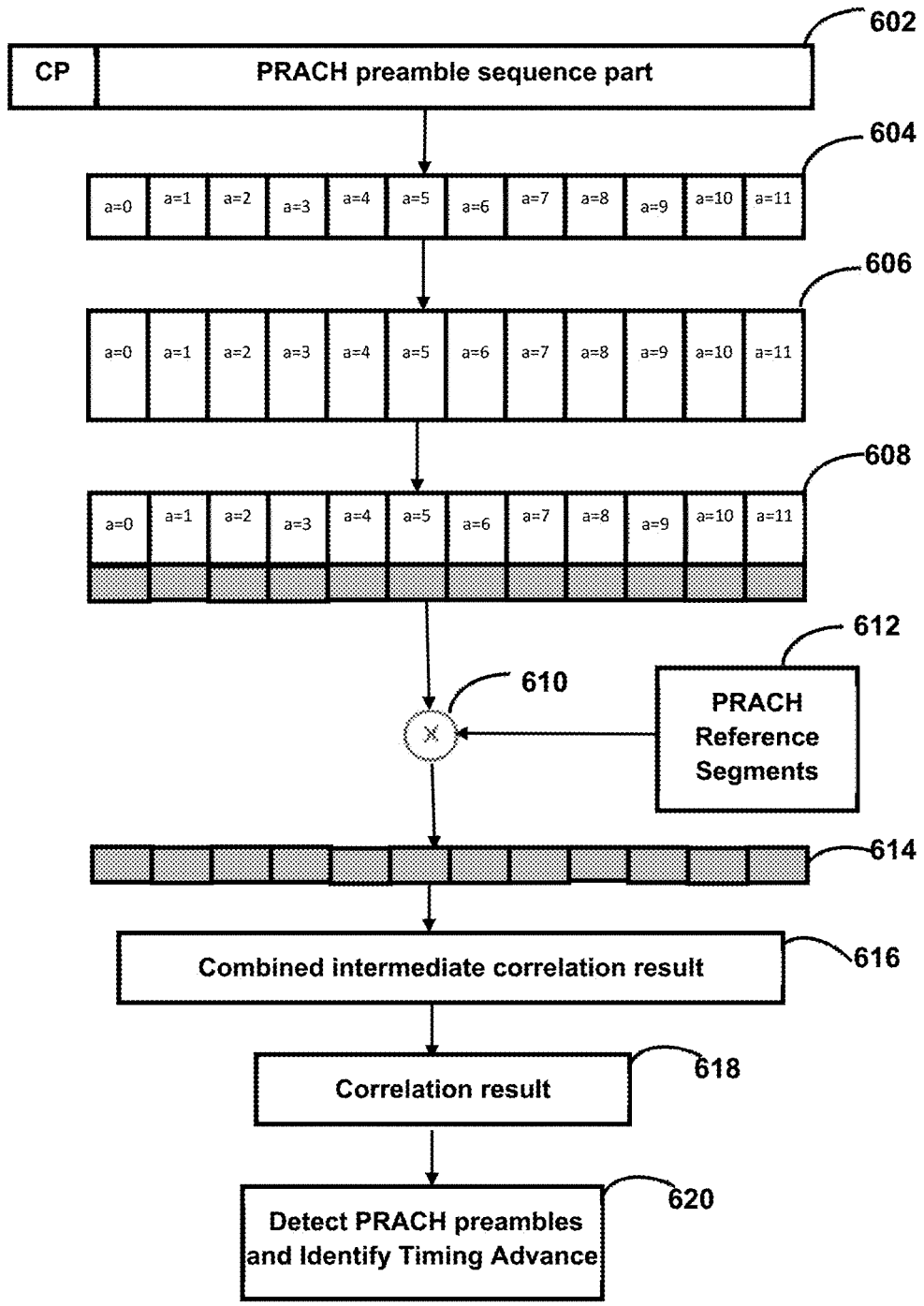
FIG. 6 illustrates a block representation of a method for detecting PRACH preambles in LTE communication system, in accordance with an embodiment of the present subject matter.

Referring now to FIG. 5 the PRACH preamble detecting unit 314 of the base station 302 is described, in accordance with an embodiment of the present subject matter. Simultaneously using FIG. 6, a block representation of a method for detecting the PRACH preambles is described along with the FIG. 5. A receiving unit 502 may receive a signal for detecting Physical Random Access Channel (PRACH) preambles, as shown at step 602. The signal may get shifted in time domain due to propagation delays in the LTE communication system. In one case, the receiver operates assuming a known timing delay which could be 0. The signal may comprise the Cyclic Prefix (CP) and a PRACH preamble sequence part.

Figure 7:
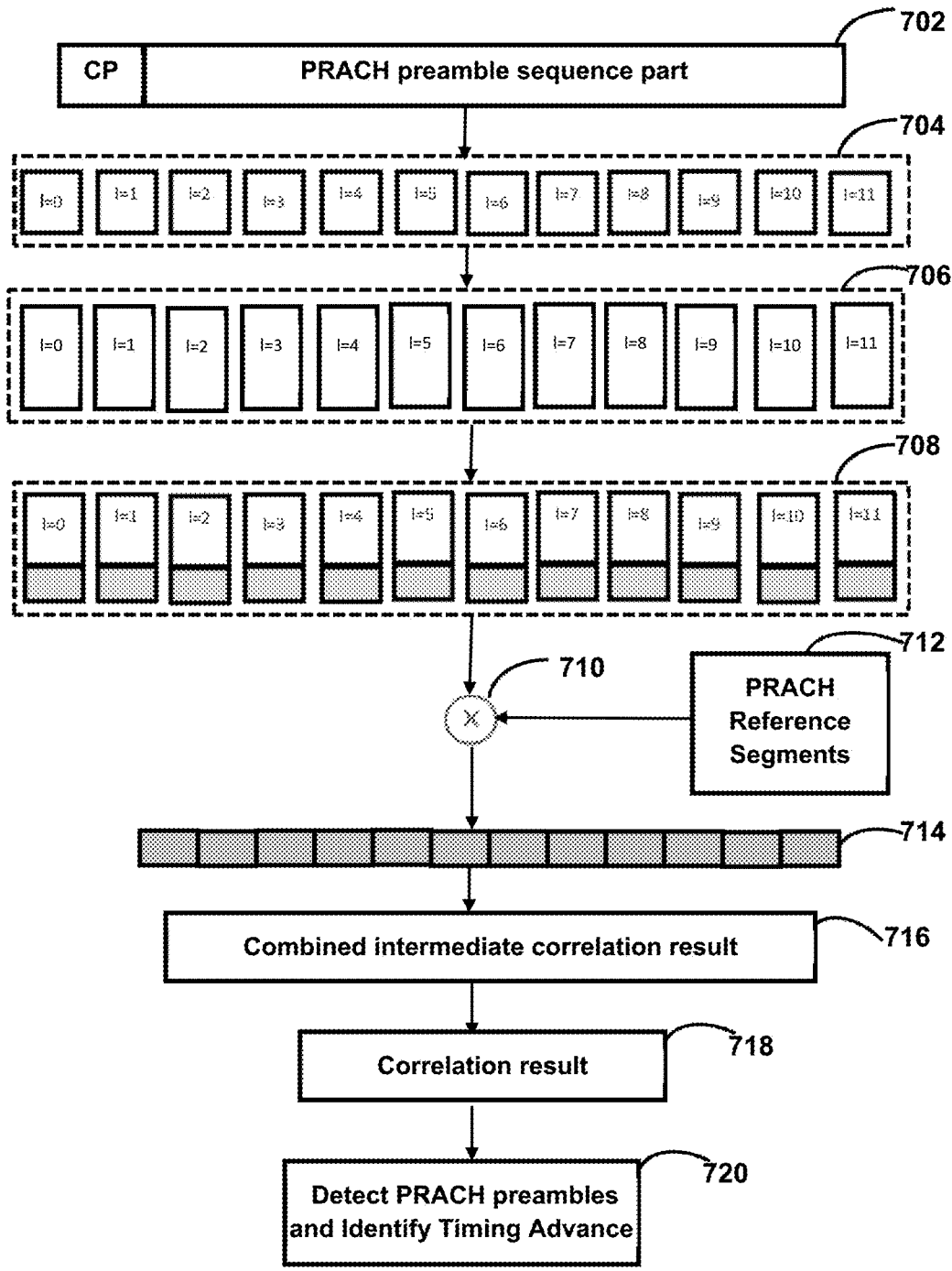
FIG. 7 illustrates a block representation of a method for detecting PRACH preambles in LTE communication system, in accordance with another embodiment of the present subject matter.

Post receiving the signal, a segmentation unit 504 may operate on the signal. The signal is now referred to as the PRACH preamble sequence part. The segmentation unit 504 may segment the signal into a plurality of segments, as shown at step 604. In one case, the plurality of segments may be of uniform sizes. The plurality of segments may be one of contiguous segments or non-contiguous segments. The contiguous segments may not have a time gap between one another, as illustrated by the step 604. But, the non-contiguous segments may have time-gap in between adjacent segments of the plurality of segments. The non-contiguous segments (l=0 to l=11) are as shown at step 704 in FIG. 7. FIG. 7 shows a block representation of a method for detecting PRACH preambles in LTE communication system, in accordance with another embodiment of the present subject matter. The steps present in the FIG. 7 works in a similar manner as the steps described using the FIG. 6. The non-contiguous segments, as shown in the FIG. 7, may correspond to Single Carrier Frequency Division Multiple Access (SC-FDMA) symbols associated with Long Term Evolution (LTE) standards.

Subsequent to generation of the plurality of segments, a third Discrete Fourier Transform (DFT) unit 506 may perform a half-subcarrier shift and a DFT on the plurality of segments to generate frequency domain segments, as shown at step 606. Thereafter, the second subcarrier de-mapping unit 508 may select frequency locations from the frequency domain segments for generating PRACH frequency segments, as shown at step 608. Specifically, the frequency locations correspond to PRACH frequency locations. In one case, for the non-contiguous segments, the half-subcarrier shift and the DFT may be performed on a useful portion of the SC-FDMA symbols in order to generate the frequency domain segments. The frequency domain segments may comprise sub-carriers spaced in accordance with the SC-FDMA signal.

Post generation of the PRACH frequency segments, a multiplication unit 510 may multiply, at step 610, the PRACH frequency segments with a complex conjugate of the PRACH reference segment (step 612) to produce intermediate correlation segments, as shown at step 614. Specifically, the value at each frequency location of the PRACH frequency segments may be multiplied with a complex conjugate of the value at a corresponding frequency location of the PRACH reference segment. In one case, each intermediate correlation segment may comprise a number of sub-carriers spanning the PRACH frequency region as defined by the LTE communication system i.e. the LTE standard. In one case, each intermediate correlation segment may comprise 72 sub-carriers.

Upon producing the intermediate correlation segments, an adding unit 512 may add corresponding frequency locations of each intermediate correlation segment for generating a combined intermediate correlation result, as shown at step 616. A second Inverse DFT (IDFT) unit 514 may perform an IDFT operation on the combined intermediate correlation result to generate a correlation result, as shown at step 618. An IDFT size of 128 is used for the PRACH reference segments in the embodiments of present invention.

Subsequent to the generation of correlation result, a PRACH preamble detection unit 516 may compare peaks of the correlation result with a predefined threshold to identify one or more peak locations. The one or more peak locations may be indicative of one or more PRACH preambles detected by the PRACH detection unit 516, as shown at step 620.

Further, a timing advance may be derived based on the peak location. The timing advance may be used by the receiver for synchronization, which was initially considered as zero by the receiver. Thereupon, the base station 302 may use the PRACH signal to determine synchronization information to be used for achieving synchronization in communication with a/the mobile terminal 304.

Thus, in one embodiment, the base station 302 may detect PRACH signals in the above described manner. It must be understood that the base station 302 may detect PRACH signals in other manners lying within the spirit and scope of the present subject matter.

Figure 8:
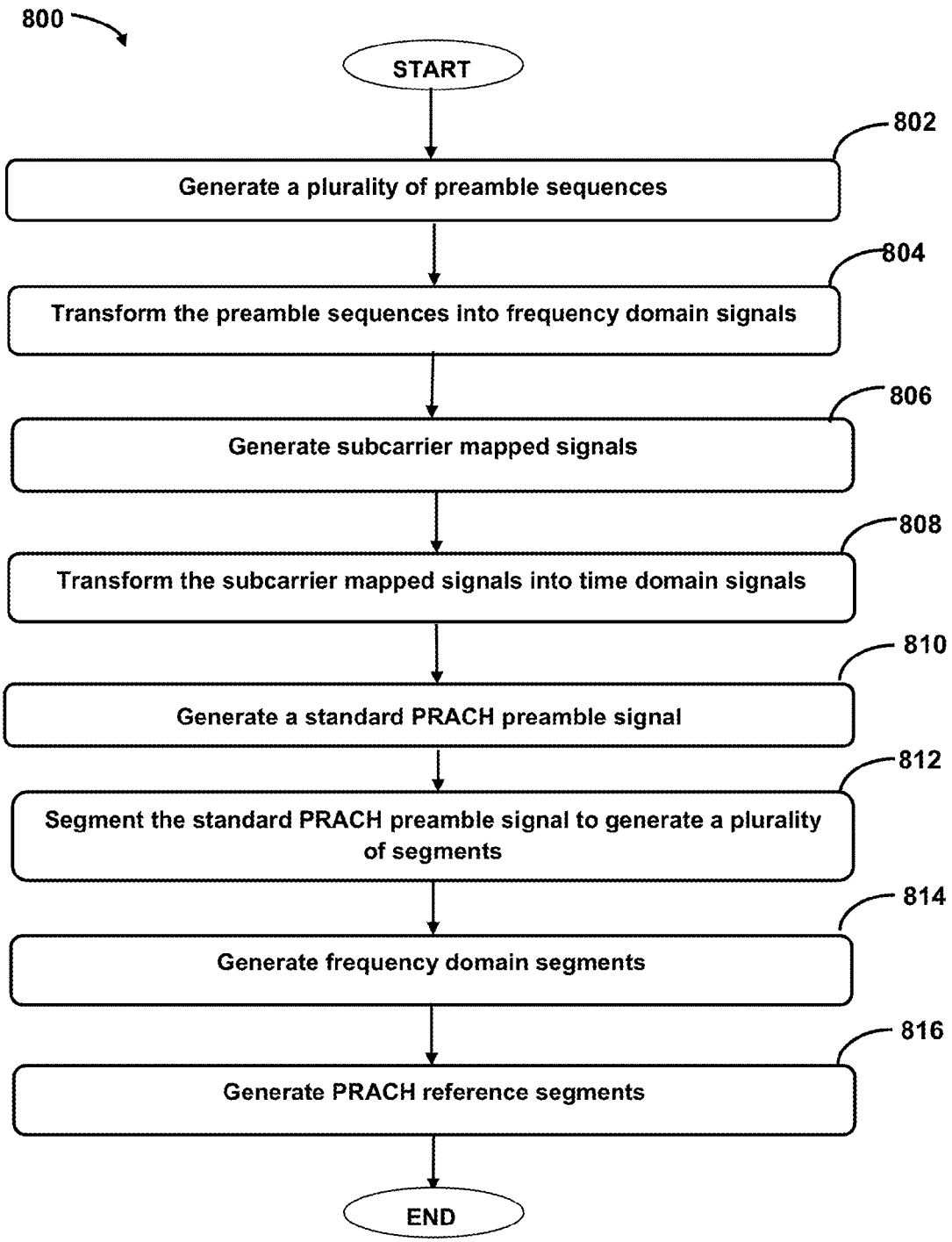
FIG. 8 shows a flowchart illustrating a method for generating PRACH reference segments in a LTE communication system, in accordance with an embodiment of the present subject matter.

Referring now to FIG. 8, a flowchart 800 illustrating a method for generating PRACH reference segments in a LTE communication system is described in accordance with an embodiment of the present subject matter. The method 800 may be described in the general context of computer executable instructions. Generally, computer executable instructions can include routines, programs, objects, components, data structures, procedures, modules, functions, etc., that perform particular functions or implement particular abstract data types. The method 800 may also be practiced in a distributed computing environment where functions are performed by remote processing devices that are linked through a communications network. In a distributed computing environment, computer executable instructions may be located in both local and remote computer storage media, including memory storage devices.

The order in which the method 800, as illustrated in FIG. 8, is described is not intended to be construed as a limitation, and any number of the described method blocks can be combined in any order to implement the method 800 or alternate methods. Additionally, individual blocks may be deleted from the method 800 without departing from the spirit and scope of the subject matter described herein. Furthermore, the method can be implemented in any suitable hardware, software, firmware, or combination thereof. However, for ease of explanation, in the embodiments described below, the method 800 may be considered to be implemented on the above described base station 302.

At block 802, a plurality of preamble sequences may be generated. The plurality of preamble sequences may be generated by using a CAZAC sequence. The plurality of preamble sequences may be generated by the base station 302.

At block 804, the preamble sequences may be transformed into frequency domain signals. The preamble sequences may be transformed by performing a DFT operation on the preamble sequences. In one implementation, the preamble sequences may be transformed by the base station 302.

At block 806, subcarrier mapped signals may be generated. The subcarrier mapped signals may be generated by performing subcarrier mapping of the frequency domain signals. The subcarrier mapping may be performed based on a subcarrier spacing associated with a Physical Random Access Channel (PRACH) in a Long Term Evolution (LTE) communication system. The subcarrier mapped signals may be generated by the base station 302.

At block 808, the subcarrier mapped signals may be transformed into time domain signals by performing an IDFT operation. The time domain signals may be sampled at a sampling rate suitable to a receiver system and a suitable IDFT length may be selected based on the sampling rate, in order to perform transformations. The subcarrier mapped signals may be transformed into the time domain signals by the base station 302.

At block 810, a standard PRACH preamble signal may be generated. The standard PRACH preamble signal may be generated by adding a Cyclic Prefix (CP) to a time domain signal of the time domain signals. Specifically, the CP is a copy of an end-segment of the time domain signal. The standard PRACH preamble signal may be generated by the base station 302.

At block 812, the standard PRACH preamble signal may be segmented to generate a plurality of segments of uniform size. The segments may either be contiguous or non-contiguous. The non-contiguous segments may be separated by a time gap accommodated in between each segment of the non-contiguous segments. The standard PRACH preamble signal may be segmented to generate a plurality of segments, by the base station 302.

At block 814, frequency domain segments may be generated by performing a half-subcarrier shift and a DFT on the plurality of segments. The frequency domain segments may comprise sub-carriers spaced in accordance with a Single Carrier Frequency Division Multiple Access (SC-FDMA) signal. The frequency domain segments may be generated by the base station 302.

At block 816, PRACH reference segments may be generated by selecting frequency locations from the frequency domain segments. Specifically, the frequency locations correspond to PRACH frequency locations. The PRACH reference segments may be generated by the base station 302.

Although implementations for methods and systems for generating Physical Random Access Channel (PRACH) reference segments in a Long Term Evolution (LTE) communication system have been described in language specific to structural features and/or methods, it is to be understood that the appended claims are not necessarily limited to the specific features or methods described. Rather, the specific features and methods are disclosed as examples of implementations for generating PRACH reference segments in the LTE communication system.

Figure 9:
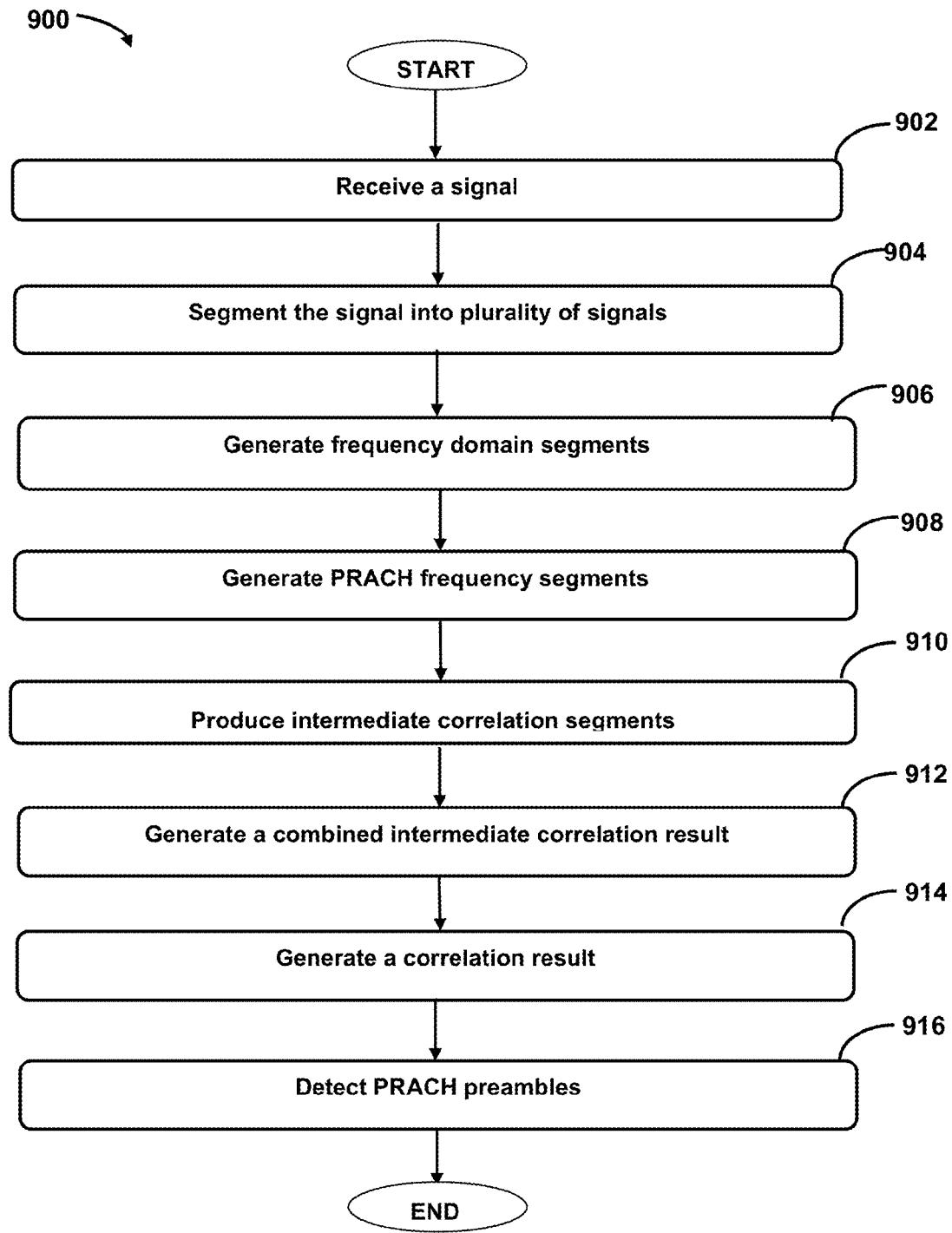
FIG. 9 shows a flowchart illustrating a method for detecting PRACH preambles in a LTE communication system, in accordance with an embodiment of the present subject matter.

Referring now to FIG. 9, a flowchart 900 illustrating a method for detecting Physical Random Access Channel (PRACH) preambles in a Long Term Evolution (LTE) communication is described in accordance with an embodiment of the present subject matter. The method 900 may be described in the general context of computer executable instructions. Generally, computer executable instructions can include routines, programs, objects, components, data structures, procedures, modules, functions, etc., that perform particular functions or implement particular abstract data types. The method 900 may also be practiced in a distributed computing environment where functions are performed by remote processing devices that are linked through a communications network. In a distributed computing environment, computer executable instructions may be located in both local and remote computer storage media, including memory storage devices.

The order in which the method 900, as illustrated in FIG. 9, is described is not intended to be construed as a limitation, and any number of the described method blocks can be combined in any order to implement the method 900 or alternate methods. Additionally, individual blocks may be deleted from the method 900 without departing from the spirit and scope of the subject matter described herein. Furthermore, the method can be implemented in any suitable hardware, software, firmware, or combination thereof. However, for ease of explanation, in the embodiments described below, the method 900 may be considered to be implemented on the above described base station 302.

At block 902, a signal may be received. The signal may be processed for detecting PRACH preambles. The signal may be received by the base station 302.

At block 904, the signal may be segmented into a plurality of segments of uniform sizes. The plurality of segments may be one of contiguous segments or non-contiguous segments. The contiguous segments may not have any time gap between one another. The non-contiguous segments may have time-gap in between adjacent segments of the plurality of segments. The non-contiguous segments may correspond to Single Carrier Frequency Division Multiple Access (SC-FDMA) symbols associated with Long Term Evolution (LTE) standards. The signal may be segmented into a plurality of segments by the base station 302.

At block 906, frequency domain segments may be generated. The frequency domain segments may be generated by performing a half-subcarrier shift and a DFT on the plurality of segments. The frequency domain segments may be generated by the base station 302.

At block 908, PRACH frequency segments may be generated. The PRACH frequency segments may be generated by selecting frequency locations from the frequency domain segments. The frequency locations may correspond to PRACH frequency locations. The PRACH frequency segments may be generated by the base station 302.

At block 910, intermediate correlation segments may be produced. The intermediate correlation segments may be produced by multiplying the value at each frequency location of the PRACH frequency segments with a complex conjugate of the value at a corresponding frequency location of a PRACH reference segment. Each intermediate correlation segment may comprise number of sub-carriers spanning the PRACH frequency region as defined in a LTE communication system. The intermediate correlation segments may be produced by the base station 302.

At block 912, a combined intermediate correlation result may be generated. The combined intermediate correlation result may be generated by adding corresponding frequency locations of each intermediate correlation segment. The combined intermediate correlation result may be generated by the base station 302.

At block 914, a correlation result may be generated. The correlation result may be generated by performing an IDFT on the combined intermediate correlation result. The correlation result may be generated by the base station 302.

At block 916, PRACH preambles may be detected. The PRACH preambles may be detected by comparing peaks of the correlation result with a predefined threshold to identify a peak location. Further, a timing delay may be identified based on the peak location. The PRACH preambles may be detected by the base station 302.

Although implementations for methods and systems for detecting Physical Random Access Channel (PRACH) in a Long Term Evolution (LTE) communication system have been described in language specific to structural features and/or methods, it is to be understood that the appended claims are not necessarily limited to the specific features or methods described. Rather, the specific features and methods are disclosed as examples of implementations for detecting the PRACH in the LTE communication system.

Exemplary embodiments discussed above may provide certain advantages. Though not required to practice aspects of the disclosure, these advantages may include those provided by the following features.

Some embodiments may enable a system and a method to reduce number of transformations of a signal between a time domain and a frequency domain, for detecting a PRACH.

Some embodiments may enable a system and a method to use a 128 point Fast Fourier Transform (FFT) for detecting PRACH preambles.

What is claimed is:

1. A method for generating Physical Random Access Channel (PRACH) reference segments in a Long Term Evolution (LTE) communication system, the method comprising: generating, by a preamble sequence generation unit, a plurality of preamble sequences using a Constant Amplitude Zero Auto Correlation (CAZAC) sequence, wherein each preamble sequence has length of a valid CAZAC sequence;

transforming, by a first Discrete Fourier Transform (DFT) unit, the plurality of preamble sequences into a plurality of frequency domain signals by performing a DFT on the plurality of preamble sequences;

generating, by a subcarrier mapping unit, a plurality of subcarrier mapped signals by performing subcarrier mapping of the plurality of frequency domain signals, wherein the subcarrier mapping is performed based on a subcarrier spacing associated with a Physical Random Access Channel (PRACH) in a Long Term Evolution (LTE) communication system;

transforming, by an Inverse DFT (IDFT) unit, the plurality of subcarrier mapped signals into a plurality of time domain signals by performing an IDFT, wherein the plurality of time domain signals are sampled at a sampling rate suitable to a receiver system and a suitable IDFT length is selected based on the sampling rate, in order to perform transformations;

generating, by a CP-insertion unit, a plurality of standard PRACH preamble signals by adding a Cyclic Prefix (CP) to each time domain signal of the plurality of time domain signals, wherein the CP is a copy of an end-segment of the time domain signal;

segmenting, by a segmenting unit, each standard PRACH preamble signal from the plurality of standard PRACH preamble signals to generate a plurality of segments of uniform size, wherein the segments are either contiguous or non-contiguous, wherein the non-contiguous segments are separated by a time gap accommodated in between each segment of the non-contiguous segments;

generating, by a second DFT unit, a plurality of frequency domain segments by performing a half-subcarrier shift and a DFT on the plurality of segments, wherein the frequency domain segments comprise sub-carriers spaced in accordance with a Single Carrier Frequency Division Multiple Access (SC-FDMA) signal; and generating, by a first subcarrier de-mapping unit, a plurality of PRACH reference segments by selecting frequency locations from the plurality of frequency domain segments, wherein the frequency locations correspond to PRACH frequency locations.

2. The method of claim 1, wherein the length of each preamble sequence is one of 839 and 139.

3. A method for detecting Physical Random Access Channel (PRACH) preambles in a Long Term Evolution (LTE) communication system, the method comprising: receiving, by a receiving unit, a signal for detecting Physical Random Access Channel (PRACH) preambles;

segmenting, by a segmentation unit, the signal into a plurality of segments of uniform sizes, wherein the plurality of segments are one of contiguous segments or non-contiguous segments, wherein the contiguous segments have no time gap between one another, and wherein the non-contiguous segments have time-gap in between adjacent segments of the plurality of segments, and wherein the non-contiguous segments correspond to Single Carrier Frequency Division Multiple Access (SC-FDMA) symbols associated with Long Term Evolution (LTE) standards;

generating, by a third Discrete Fourier Transform (DFT) unit, frequency domain segments by performing a half-subcarrier shift and a DFT on the plurality of segments;

generating, by a subcarrier de-mapping unit, a plurality of PRACH frequency segments by selecting frequency locations from the frequency domain segments, wherein the frequency locations correspond to PRACH frequency locations;

producing, by a multiplication unit, a plurality of intermediate correlation segments by multiplying values at each frequency location of the plurality of PRACH frequency segments with a complex conjugate of the values at corresponding frequency locations of a plurality of PRACH reference segments, wherein each intermediate correlation segment comprises a number of sub-carriers spanning the PRACH frequency region as defined in a LTE communication system;

generating, by an adding unit, a plurality of combined intermediate correlation results by adding the values at the corresponding frequency locations of each intermediate correlation segment;

generating, by a second Inverse DFT (IDFT) unit, a plurality of correlation results by performing an IDFT on the combined intermediate correlation result; and detecting, by a PRACH preamble detection unit, one or more PRACH preambles by comparing peaks of the plurality of correlation results with a predefined threshold to identify one or more peak locations, and identifying timing delays based on the identified peak locations.

4. The method of claim 3, wherein the half-subcarrier shift and the DFT is performed on a useful portion of the SC-FDMA symbols to generate the frequency domain segments for the non-contiguous segments, wherein the frequency domain segments comprise sub-carriers spaced in accordance with a SC-FDMA signal.

5. The method of claim 3, wherein each intermediate correlation segment comprises 72 sub-carriers.

6. The method of claim 3, wherein IDFT size of the PRACH reference segments is 128.

7. A base station for generating Physical Random Access Channel (PRACH) reference segments in a Long Term Evolution (LTE) communication system, the base station comprises:
   a processor;
   a memory coupled to the processor, wherein the processor is connected to a plurality of units configured to perform a function, and wherein the plurality of units comprise:
      a preamble sequence generation unit to generate a plurality of preamble sequences using a CAZAC sequence, wherein each preamble sequence has length of a valid CAZAC sequence;
      a first Discrete Fourier Transform (DFT) unit to transform the plurality of preamble sequences into a plurality of frequency domain signals by performing a DFT on the plurality of preamble sequences;
      a subcarrier mapping unit to generate a plurality of subcarrier mapped signals by performing subcarrier mapping of the plurality of frequency domain signals, wherein the subcarrier mapping is performed based on a subcarrier spacing associated with a Physical Random Access Channel (PRACH) in a Long Term Evolution (LTE) communication system;
      an Inverse DFT (IDFT) unit to transform the plurality of subcarrier mapped signals into a plurality of time domain signals by performing an IDFT, wherein the plurality of time domain signals are sampled at a sampling rate suitable to a receiver system and a suitable IDFT length is selected based on the sampling rate, in order to perform transformations; a CP-insertion unit to generate to a plurality of standard PRACH preamble signals by adding a Cyclic Prefix (CP) to each time domain signal of the plurality of time domain signals, wherein the CP is a copy of an end-segment of the time domain signal;
      a segmenting unit to segment each standard PRACH preamble signal from the plurality of standard PRACH preamble signals to generate a plurality of segments of uniform size, wherein the segments are either contiguous or non-contiguous, wherein the non-contiguous segments are separated by a time gap accommodated in between each segment of the non-contiguous segments;
      a second DFT unit to generate a plurality of frequency domain segments by performing a half-subcarrier shift and a DFT on the plurality of segments, wherein the frequency domain segments comprise sub-carriers spaced in accordance with a Single Carrier Frequency Division Multiple Access (SC-FDMA) signal; and
      a first subcarrier de-mapping unit to generate a plurality of PRACH reference segments by selecting frequency locations from the plurality of frequency domain segments, wherein the frequency locations correspond to PRACH frequency locations.

8. The base station of claim 7, wherein the length of each preamble sequence is one of 839 and 139.

9. A base station for detecting Physical Random Access Channel (PRACH) preambles in a Long Term Evolution (LTE) communication system, the base station comprises:
   a processor;
   a memory coupled to the processor, wherein the processor is connected to a plurality of units configured to perform a function, and wherein the plurality of units comprise:
      a receiving unit to receive a signal for detecting Physical Random Access Channel (PRACH) preambles;
      a segmentation unit to segment the signal into a plurality of segments of uniform sizes, wherein the plurality of segments are one of contiguous segments or non-contiguous segments, wherein the contiguous segments have no time gap between one another, and wherein the non-contiguous segments have time-gap in between adjacent segments of the plurality of segments, and wherein the non-contiguous segments correspond to Single Carrier Frequency Division Multiple Access (SC-FDMA) symbols associated with Long Term Evolution (LTE) standards;
      a third Discrete Fourier Transform (DFT) unit to generate frequency domain segments by performing a half-subcarrier shift and a DFT on the plurality of segments;
      a subcarrier de-mapping unit to generate a plurality of PRACH frequency segments by selecting frequency locations from the frequency domain segments, wherein the frequency locations correspond to PRACH frequency locations;
      a multiplication unit to produce a plurality of intermediate correlation segments by multiplying values at each frequency location of the plurality of PRACH frequency segments with a complex conjugate of the values at corresponding frequency locations of a plurality of PRACH reference segments, wherein each intermediate correlation segment comprises a number of sub-carriers spanning the PRACH frequency region as defined in a LTE communication system;
      an adding unit to generate a plurality of combined intermediate correlation results by adding the values at corresponding frequency locations of each intermediate correlation segment;
      a second Inverse DFT (IDFT) unit to generate a plurality of correlation results by performing an IDFT on the combined intermediate correlation result; and
      a PRACH preamble detection unit to detect one or more PRACH preambles by comparing peaks of the plurality of correlation results with a predefined threshold to identify one or more peak locations, and identifying timing delays based on identified peak locations.

10. The base station of claim 9, wherein the half-subcarrier shift and the DFT is performed on a useful portion of the SC-FDMA symbols to generate the frequency domain segments for the non-contiguous segments, wherein the frequency domain segments comprise sub-carriers spaced in accordance with a SC-FDMA signal.

11. The base station of claim 9, wherein each intermediate correlation segment comprises 72 sub-carriers.

12. The base station of claim 9, wherein IDFT size of the PRACH reference segments is 128.

13. A non-transitory computer readable medium embodying a program executable in a base station for generating Physical Random Access Channel (PRACH) reference segments in a Long Term Evolution (LTE) communication system, the program comprising:
   a program code for generating a plurality of preamble sequences using a CAZAC sequence, wherein each preamble sequence has length of a valid CAZAC sequence;

a program code for transforming the plurality of preamble sequences into a plurality of frequency domain signals by performing a DFT on the plurality of preamble sequences;

a program code for generating a plurality of subcarrier mapped signals by performing subcarrier mapping of the plurality of frequency domain signals, wherein the subcarrier mapping is performed based on a subcarrier spacing associated with a Physical Random Access Channel (PRACH) in a Long Term Evolution (LTE) communication system;

a program code for transforming the plurality of subcarrier mapped signals into a plurality of time domain signals by performing an IDFT, wherein the plurality of time domain signals are sampled at a sampling rate suitable to a receiver system and a suitable IDFT length is selected based on the sampling rate, in order to perform transformations;

a program code for generating a plurality of standard PRACH preamble signals by adding a Cyclic Prefix (CP) to each time domain signal of the plurality of time domain signals, wherein the CP is a copy of an end-segment of the time domain signal;

a program code for segmenting each standard PRACH preamble signal from the plurality of standard PRACH preamble signals to generate a plurality of segments of uniform size, wherein the segments are either contiguous or non-contiguous, wherein the non-contiguous segments are separated by a time gap accommodated in between each segment of the non-contiguous segments;

a program code for generating a plurality of frequency domain segments by performing a half-subcarrier shift and a DFT on the plurality of segments, wherein the frequency domain segments comprise sub-carriers spaced in accordance with a Single Carrier Frequency Division Multiple Access (SC-FDMA) signal; and a program code for generating a plurality of PRACH reference segments by selecting frequency locations from the plurality of frequency domain segments, wherein the frequency locations correspond to PRACH frequency locations.

14. A non-transitory computer readable medium embodying a program executable in a base station for detecting Physical Random Access Channel (PRACH) preambles in a Long Term Evolution (LTE) communication system, the program comprising:

a program code for receiving a signal for detecting Physical Random Access Channel (PRACH) preambles;

a program code for segmenting the signal into a plurality of segments of uniform sizes, wherein the plurality of segments are one of contiguous segments or non-contiguous segments, wherein the contiguous segments have no time gap between one another, and wherein the non-contiguous segments have time-gap in between adjacent segments of the plurality of segments, and wherein the non-contiguous segments correspond to Single Carrier Frequency Division Multiple Access (SC-FDMA) symbols associated with Long Term Evolution (LTE) standards;

a program code for generating frequency domain segments by performing a half-subcarrier shift and a DFT on the plurality of segments;

a program code for generating a plurality of PRACH frequency segments by selecting frequency locations from the frequency domain segments, wherein the frequency locations correspond to PRACH frequency locations;

a program code for producing a plurality of intermediate correlation segments by multiplying values at each frequency location of the plurality of PRACH frequency segments with a complex conjugate of the values at a corresponding frequency locations of a plurality of PRACH reference segments, wherein each intermediate correlation segment comprises a number of sub-carriers spanning the PRACH frequency region as defined in a LTE communication system;

a program code for generating a plurality of combined intermediate correlation results by adding the values at corresponding frequency locations of each intermediate correlation segment;

a program code for generating a plurality of correlation results by performing an IDFT on the combined intermediate correlation results; and a program code for detecting one or more PRACH preambles by comparing peaks of the plurality of correlation results with a predefined threshold to identify one or more peak locations, and identifying timing delays based on the identified peak locations.

* * * * *